United States Patent [19]

Siorek

[11] 3,994,352
[45] Nov. 30, 1976

[54] TRACKED VEHICLE EMERGENCY BRAKE SYSTEM

[75] Inventor: Richard W. Siorek, Warren, Mich.

[73] Assignee: The United States of America as represented by the Secretary of the Army, Washington, D.C.

[22] Filed: Mar. 19, 1975

[21] Appl. No.: 559,857

[52] U.S. Cl. .......................... 180/9.2 R; 180/103 R; 188/110; 305/9
[51] Int. Cl.² ........................................ B62D 55/00
[58] Field of Search ................. 180/6, 7, 9.2, 103 R; 305/9; 188/110; 89/36 H, 40 B

[56] References Cited
UNITED STATES PATENTS

| | | | |
|---|---|---|---|
| 2,483,170 | 9/1949 | Askue | 305/9 |
| 3,460,645 | 8/1969 | Brown et al. | 305/9 |
| 3,580,345 | 5/1971 | Brown | 305/9 X |
| 3,704,757 | 12/1972 | Buress | 305/9 |

*Primary Examiner*—M. H. Wood, Jr.
*Assistant Examiner*—John A. Pekar
*Attorney, Agent, or Firm*—Peter A. Taucher; John E. McRae; Nathan Edelberg

[57] ABSTRACT

The invention relates to an emergency braking system for a tracked vehicle, such as a military tank. Loss or separation of one or both tracks from the vehicle energizes an electrical sensor which automatically triggers an emergency brake control system operating on the road wheels. The track loss triggers a "driver override" system that inhibits manual steering, manual shift change, and manual sprocket brake operation. The emergency system takes over control of the vehicle to preclude the driver from making unsafe inputs to the system.

9 Claims, 6 Drawing Figures

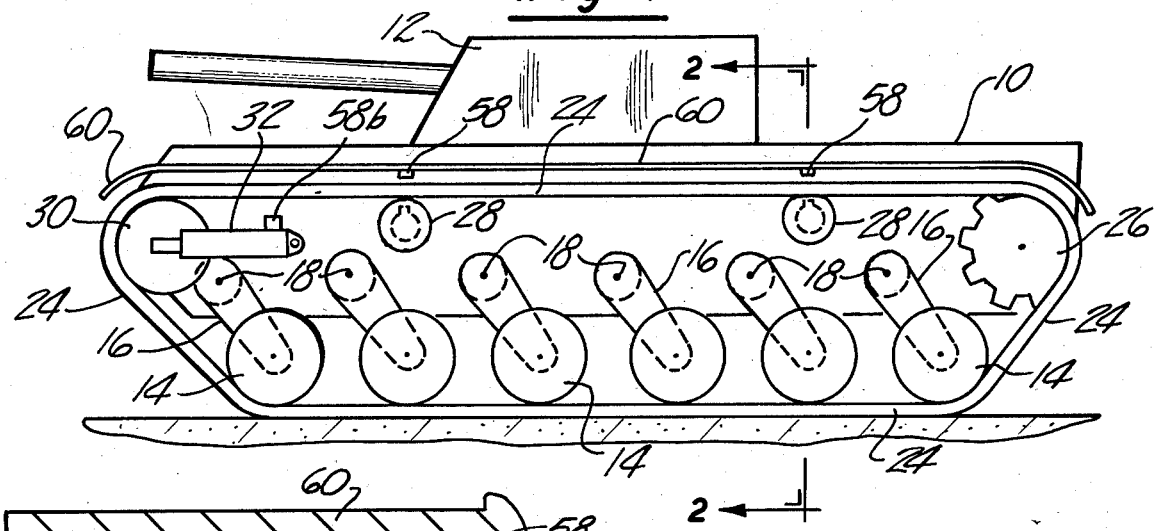
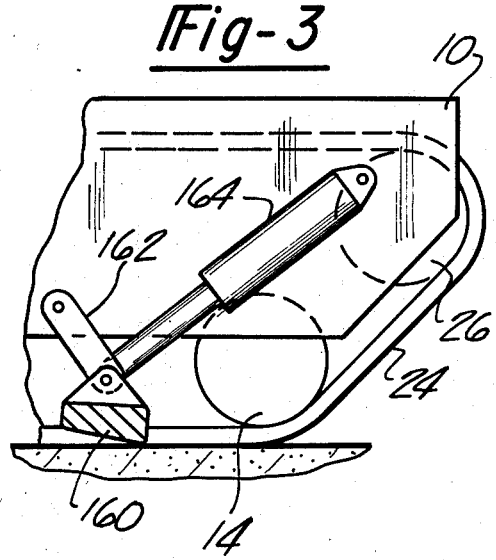
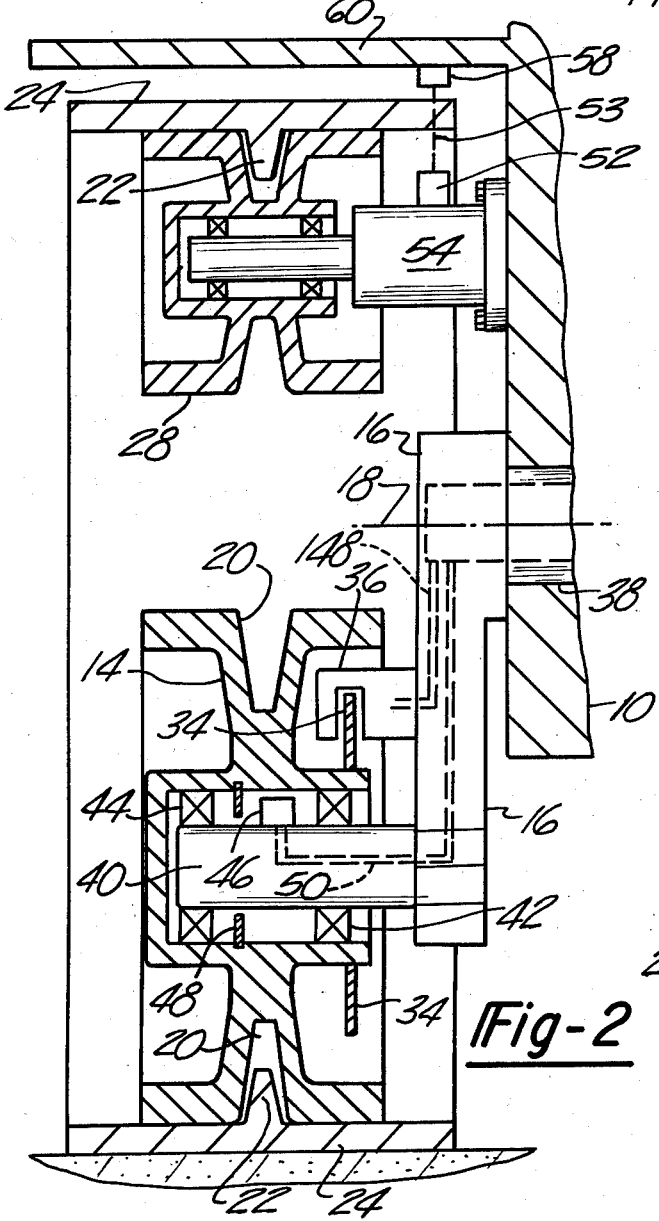
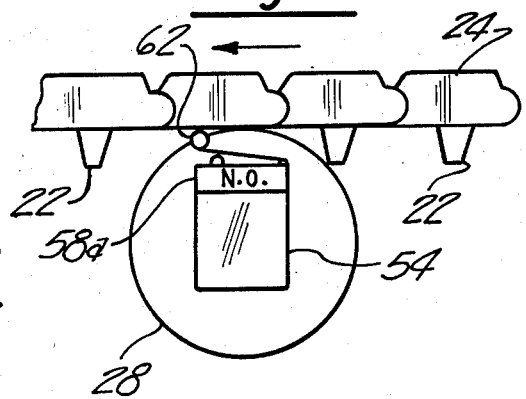

TRACKED VEHICLE EMERGENCY BRAKE SYSTEM

BACKGROUND AND SUMMARY

Tracked military vehicle capable of high speeds, e.g. speeds in excess of 30 miles per hour, are susceptible to catastrophic destruction on the occurrence of track loss, whether from connector pin failure, linkage failure, or guide system failure. Vehicle stability and control suffers greatly, especially if only one track is separated (lost) from the vehicle. In such a case, the rolling resistance of the vehicle on the "lost track" side is suddenly reduced. Additionally, the still-operable track continues to receive power, thereby tending to decrease the effective driving force to the other side of the vehicle. Depending on vehicle mass, inertia and the nature of the terrain, the untracked side may decelerate at a faster or slower rate than the tracked side. The vehicle thus tends to swerve and possibly even roll over rather than coming to a straight stop. The swerving condition is especially dangerous at high speeds when the vehicle may entirely lose a track within a time interval of one second or less, usually before the driver is aware of the dangerous condition.

The present invention proposes an emergency brake system that is automatically triggered by loss or separation of one or both tracks. One or more track-loss sensors produce braking actions at the road wheels and/or at skid rams carried on the vehicle. Preferably the braking action is modulated or pulsed so that braking pressure is directed to the faster moving road wheels, thereby tending to prevent skidding of the wheels or swerving of the vehicle.

The track-loss sensors also preferably act as triggering devices for a "driver override" system that automatically cuts out the conventional manual sprocket brake, manual shift, and manual steer.

THE DRAWINGS

FIG. 1 is a side elevational view of a conventional military tank incorporating the invention.

FIG. 2 is a fragmentary sectional view taken on line 2—2 in FIG. 1.

FIG. 3 is a fragmentary side elevational view of a military tank incorporating a skid ram proposed under the invention.

FIG. 4 illustrates a track-loss sensor useful in practice of the invention.

FIG. 1 — GENERAL VEHICLE CONSTRUCTION

Figure 5:
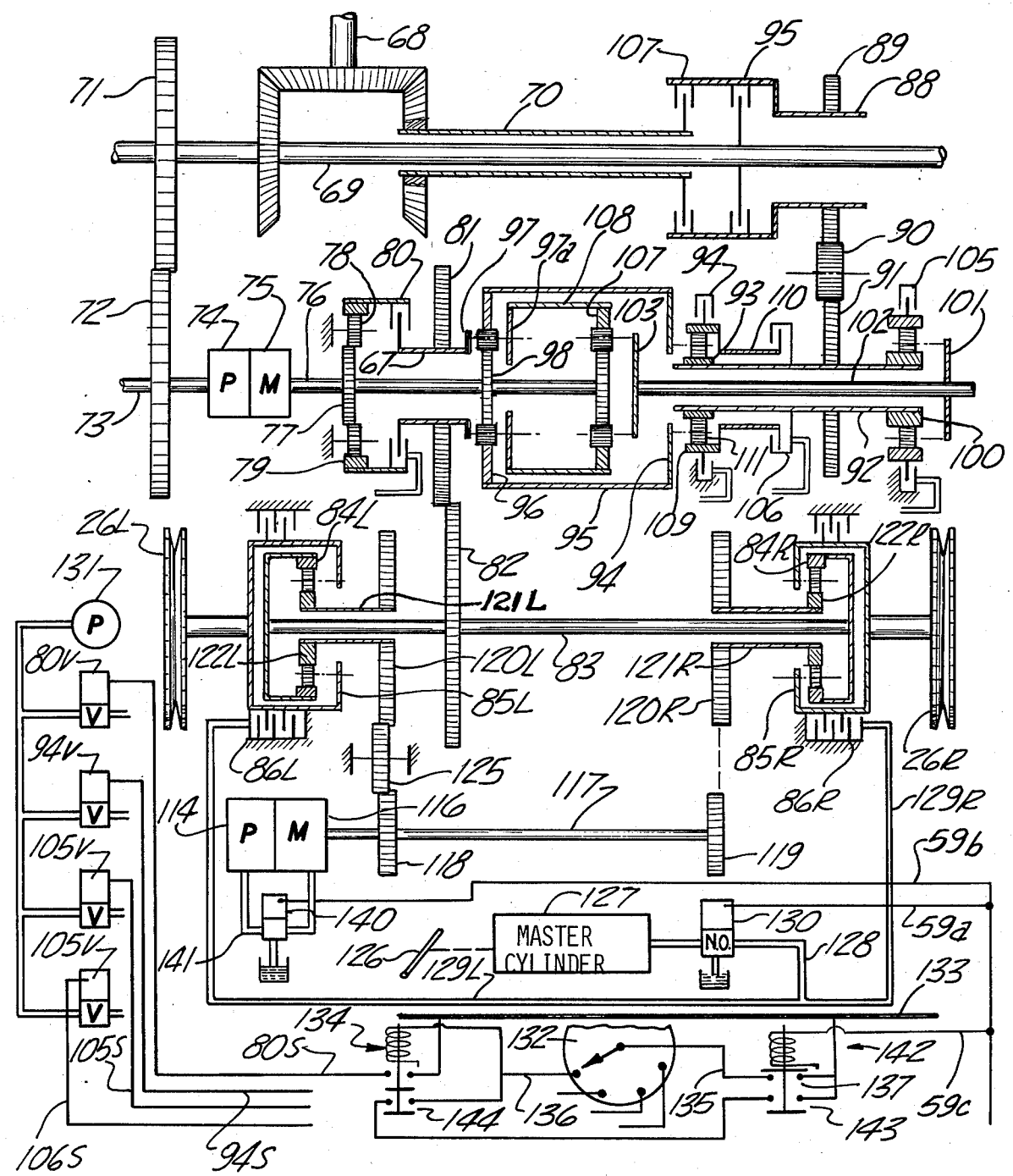
FIG. 5 is a schematic illustration of a conventional control system for driving, steering and braking a tracked vehicle.

As seen in FIG. 1, the tank type vehicle comprises a hull 10 having a rotary gun turret 12. Tank suspension comprises six conventional road wheels 14 along each side of the vehicle, each road wheel being rotatably carried on a road arm 16 that is swingably attached to the hull for limited arcuate movement around a transverse axis 18. The hull weight is resiliently borne by the arms in conventional fashion, as for example, by interposed torsion bars, coil springs, hydraulic actuators, etc.

The road wheels are peripherally grooved, as shown at 20 in FIG. 2, to accommodate upstanding center guides 22 carried by the terrain-engaging track 24; the road wheels thus maintain the track in the desired longitudinal plane. As seen in FIG. 1, each track is trained under the six road wheels 14, around a drive sprocket 26, over two return guide rollers 28, and around an idler wheel 30. A conventional hydraulic cylinder or ram 32 may be arranged to exert a predetermined horizontal load on the shaft of each idler wheel 30, thereby maintaining a desired track tension in spite of track envelope size variations due to terrain irregularities and/or abrupt track speed changes (braking and accelerating).

It is customary in conventional tracked vehicles to brake the vehicle by applying braking forces to the drive sprockets; the present invention contemplates such conventional brake structure. However, it should be realized that brake elements located at the drive sprockets lose effectiveness as soon as the sprocket no longer exerts torque on the terrain-engaged track. Therefore the illustrated vehicle also employs auxiliary braking elements located at the road wheels 14; these auxiliary brake elements are effective to decelerate the vehicle in spite of track loss or separation.

FIG. 2 — AUXILIARY BRAKE PER SE

As seen in FIG. 2, an illustrative auxiliary brake mechanism comprises a disk element 34 carried by the hub portion of wheel 14, and a conventional caliper 36 mounted on road arm 16. Brake pads within the caliper apply frictional pressure on the disk to decelerate the vehicle. Each of the twelve road wheels (six on each side of the vehicle) may be provided with brake assemblies of the type shown in FIG. 2. In the alternative, only selected ones of the road wheels may be so equipped.

Each brake assembly may be supplied with pressurized brake fluid through conduits running within the associated road arm 16, then into the hull 10 along pivot axis 18. Barrel portion 38 of the road arm can be hollow to accommodate the conduit. Each road wheel 14 can be rotatably mounted on a stub shaft 40 affixed to road arm 16; suitable anti-friction bearings are illustrated at 42, 44.

FIG. 3 BRAKE

Emergency brake action may be supplemented or replaced by the "skid-ram" type brake shown in FIG. 3. It takes the form of a terrain-engaging shoe 160 carried by a suspension arm 162 suitably connected to hull 10. Double-acting hydraulic cylinder 164 would move shoe 160 downwardly when supplied with power fluid source 147 (FIG. 5). During normal run periods, cylinder 164 would be actuated to retract shoe 160 into the hull. Conceivably, two separate shoe-cylinder assemblies could be employed near opposite sides of the vehicle. In some cases, it is believed that a single assembly located on the longitudinal center line of the vehicle would be sufficient to provide a reasonably straight emergency stop action.

ROAD WHEEL SPEED SENSORS

The auxiliary brake system requires road wheel speed sensors to control the application of brake pressure. Preferably the road wheel speed sensors are located in the hub position of the associated road wheel concealed from mud debris, water, etc. The axial space between bearings 42 and 44 may be used to house a road wheel speed sensor mechanism, shown as a first element 46 carried on shaft 40 and a second cooperating disc element 48 carried on the hub portion of wheel 14. Element 46 may be an electro-magnetic transducer of the general construction described in U.S. Pat. No. 3,450,444. Disc element 48 is provided with one or more serations, slots, or surface discontinuities which interact with the magnetic field generated by element 46, thereby inducing voltage pulses which are directed through suitable conductors running through shaft 40 and road arm 16, as shown generally at 50. The electrical output has a frequency related to wheel speed. A variable frequency signal may alternately be provided by an electro-optical sensor (the rotating disc interrupts a light beam directed towards a photocell target on shaft 40). Demodulators may be associated with the road wheel speed sensors to translate the variable frequency into a useful signal analog.

Selected ones of the road wheels on each side of the vehicle are provided with wheel speed sensors 46, thereby enabling the wheel speeds to be compared for the purpose of controlling the application of braking pressure to the faster moving wheels, i.e., to bring the wheels at opposite sides of the vehicle down to approximately the same speed, thereby preventing potential swerving of the vehicle.

TRACK LOSS SENSORS

Some mechanism must be provided to sense the "lost track" condition. FIG. 2 schematically shows an electro-optical transducer for this purpose. As shown, the transducer comprises a light source 52 mounted on the shaft support 54 for one of the return guide rollers 28. Source 52 directs a light beam 53 upwardly towards a cadmium sulfide photocell 58 mounted on the underside of fender 60. The light beam intersects the path taken by the track as it passes over roller 28. Therefore, as long as the track is present or operative, the photocell remains in a de-energized state. Upon loss of the track, the light beam energizes the photocell. Electric output of the photocell can be used to trigger the emergency braking system.

The sensor type is not considered critical. FIG. 4 illustrates an alternative construction taking the form of a snap-action switch 58a having a roller arm 62 engaging the underside of the track as it moves over guide roller 28. Loss of the track permits a spring means (not shown) associated with switch 58a to move arm structure 62 upwardly into the area vacated by the track, thereby producing a trigger signal for the braking system.

Another type of sensor being considered is a load cell structure interposed between the vehicle hull and one or more of the shaft supports 54. Load cells commonly comprise tension bolts having strain gages associated therewith; electrical output of the gage is related to the stress applied to the bolt. When employed as a track loss sensor the bolt would be used as a means to mount shaft support 54 (FIG. 2) onto the hull; the load imposed on shaft support 54 by the overhead track would be transmitted to the load cell mounting bolt. Loss of the track would relieve the load on the bolt, thereby enabling the associated strain gage to emit a signal representing the changed condition.

FIG. 1 shows a track loss sensor 58b associated with the track-tension ram 32. In this case the sensor takes the form of a pressure-sensitive switch exposed to the hydraulic pressure existing within the right end of ram 32. On loss of track the piston portion of the ram moves forward, thereby reducing the hydraulic pressure presented to sensor switch 58b. This action can be used to generate a brake system trigger signal.

Preferably a number of track loss sensors are used on each side of the vehicle to obviate against malfunction of any one sensor, and also to provide early warning of track loss. As shown in FIG. 1, three track loss sensors are provided; a sensor 58 or 58a at each of the return rollers 28, and a third sensor 58b at the forward idler wheel 30; the illustrated sensors are duplicated at the non-visible side of the vehicle. The point at which the track separates or leaves the guide system is not predictable. The track may run off in a rearward direction or in a forward direction. Use of a plurality of sensors at spaced locations along the vehicle improves responses time to various eventualities or situations.

FIG. 5 — DRIVE SYSTEM

Figure 6:
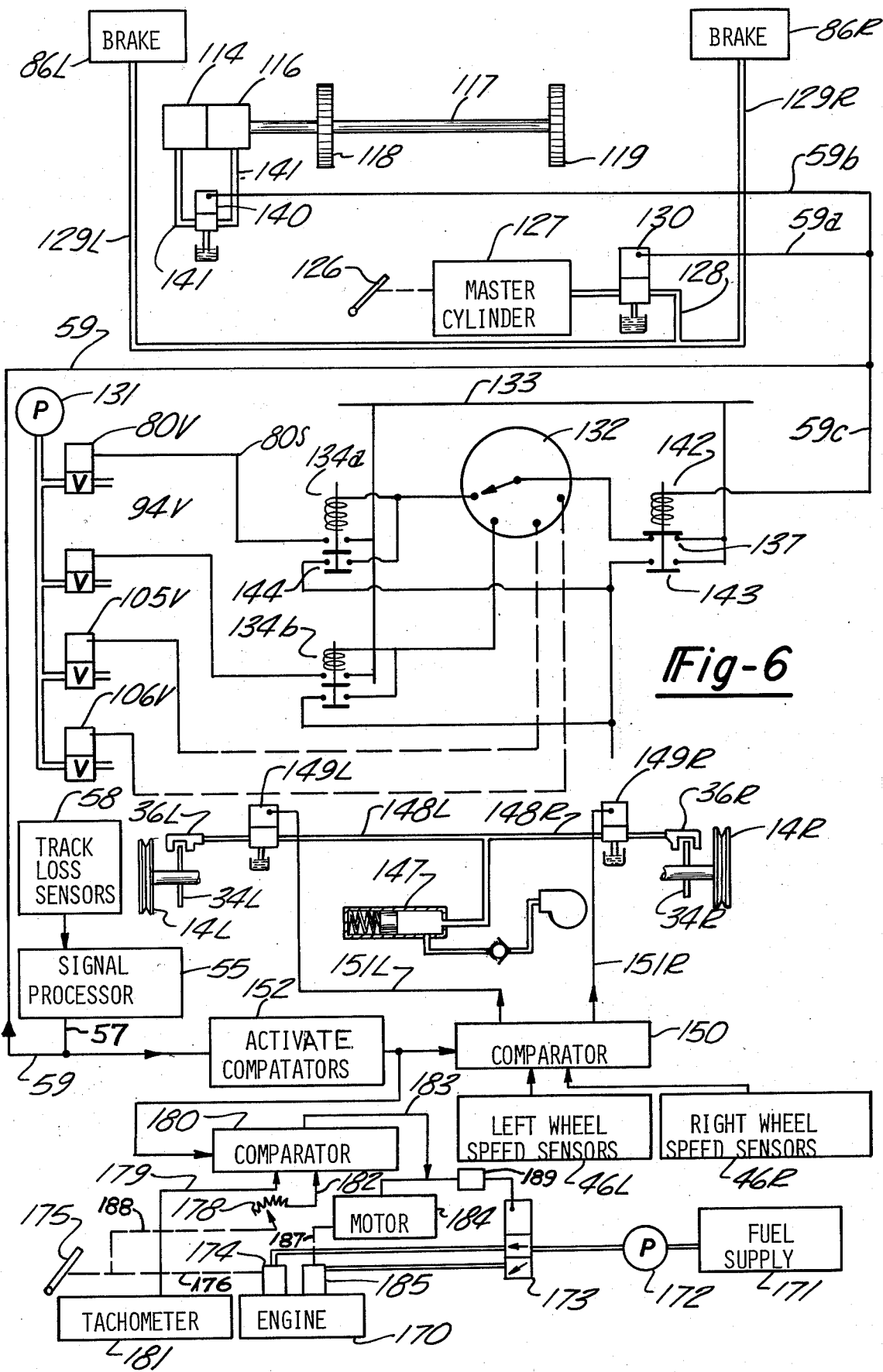
FIG. 6 is a schematic illustration of an emergency brake system constructed according to this invention for interaction with the FIG. 5 control system.

FIGS. 5 and 6, taken together, show generally how the previously described track loss sensors and wheel speed sensors can be embodied in an emergency brake system which interacts with conventional braking, steering, and propulsion components in a conventional hydro-mechanical vehicle drive system. The drive (propulsion) system is shown in FIG. 5, and the emergency system is shown in FIG. 6.

The illustrated propulsion system contemplates an engine and torque converter (not shown) suitably arranged to power a drive shaft 68. Forward drive is through a transverse shaft 69 and disengageable clutch 95; reverse drive is through a sleeve 70 and disengageable clutch 107. Four forward speed ratios may be obtained, as for example by engaging selected ones of clutches 80, 94, 105 and 106 located in the drive train.

The first forward gear (0–5 m.p.h.) is obtained by engaging clutch 80. The drive train then comprises gears 71 and 72, shaft 73, variable speed hydraulic pump 74, hydraulic motor 75 receiving motive fluid from pump 74, shaft 76, sun gear 77, planet gears 78, ring gear 79, clutch 80, sleeve 67, meshed gears 81 and 82, shaft 83, ring gears 84L and 84R, the associated planets, and planet carriers 85L and 85R affixed to the shafts for track drive sprockets 26L and 26R. During straight-ahead motion the associated clutches 86L and 86R are disengaged.

The second forward gear (5–15 m.p.h.) is obtained by engaging clutch 94. The drive train comprises shaft 69, clutch 95, sleeve 88, meshed gears 89, 90 and 91, sleeve 92, sun gear 93 and associated planet gears, planet carrier 94, drum 95, ring gear 96 and the associated planet gears, planet carrier 97, sleeve 67, and the remaining drive train elements 81 through 85 previously described. The drive train for second gear also comprises gears 71 and 72, pump 74, motor 75, shaft 76, and sun gear 98. Due to the "extra" gear 90 on the mechanical side of the transmission sun gear 98 is powered in a reverse direction relative to ring gear 96 so that the speed of sleeve 67 is the differential of the speeds of ring gear 96 and sun gear 98.

In third forward gear (15–30 m.p.h.) clutch 105 is engaged. The drive train comprises shaft 69, clutch 95, sleeve 88, meshed gears 89, 90 and 91, sleeve 92, sun gear 100, the associated planet gears, planet carrier 101, shaft 102, planet carrier 103, and the associated planet gears, ring gear 107, drum 108, planet carriers 97a and 97, sleeve 67 and the previously described drive train elements 81 through 85. At the same time gear 98 is being driven by pump 75 in the previously described fashion so that the speed of sleeve 67 is the differential of the speeds of carrier 97a and gear 98. Ring gear 96 is not a drive element.

Foruth forward gear (+30 m.p.h.) is obtained by engaging clutch 106. The drive train comprises shaft 69, clutch 95, sleeve 88, gears 89, 90 and 91, sleeve 92, clutch 106, sleeve 110, ring gear 109 and associated planet gears 111, planet carrier 94, drum 95, ring gear 96 and associated planet gears, planet carrier 97, sleeve 67, and the previously described drive train elements 81 through 85. Gear 98 is driven by motor 75 as before. Fourth gear differs from second gear in that planet gears 111 are driven by ring gear 109 rather than sun gear 93; therefore carrier 94 is driven at a different speed and in a different direction. The speed of sleeve 67 is related to the summation of the speeds of gears 96 and 98.

As before indicated, reverse drive is obtained by engaging clutch 107. The drive train is through sleeve 70, clutch 107, sleeve 88, gears 89, 90 and 91, sleeve 92, sun gear 93, planet gears 111, carrier 94, drum 95, ring gear 96, carrier 97, sleeve 67, and the remaining drive elements 81 through 85; gear 98 is driven by motor 75.

CLUTCH CONTROL

The various clutches may be controlled in conventional fashion, either manually and/or automatically by speed responsive devices, as shown for example in U.S. Pat. No. 3,797,330. FIG. 5 schematically illustrates four solenoid valves 80V, 94V, 105V and 106V for controlling the admission of pressure fluid from pump 131 to respective ones of clutches 80, 94, 105 and 106. A manually-operated selector switch 132 delivers electrical power from a main supply conductor 133 to selected ones of the solenoid supply lines 80S, 94S, 105S and 106S. Each supply line may be equipped with a relay similar to the illustrated relay 134. A "master" relay 142 is associated with selector switch 132 to effectively hold the switch at a selected position on the occurrence of a track loss situation. Relay 142 has no effect on switch action during "normal run" periods.

Energization of valve 80V involves control current flow through a path comprising normally closed contacts 137, line 135, selector switch 132, line 136 and the coil of relay 134. The contacts in relay 134 thereby close to deliver power from conductor 133 to line 80S and valve 80V. As before noted, each of the other solenoid supply lines 94S, 105S and 106S may be provided with a relay similar to relay 134. Therefore, manual operation of selector switch 132 produces selective energization of the solenoids, hence selective opening of the solenoid valves, with consequent actuation of the associated clutches 80 or 94 or 105 or 106.

The illustrated clutch actuation mechanism may be considered conventional. It is illustrated primarily to better show how an emergency control system of the present invention can be made to interact with the clutch actuator devices for maintaining an operative drive system upon the occurrence of emergency conditions (i.e., loss of the right or left track 24R or 24L).

NORMAL STEERING SYSTEM

Normal steering may be accomplished by driving sprockets 26L and 26R in different directions or at different speeds; steering force is through a variable displacement pump 114 driven from continuously rotating gear 73. Hydraulic fluid delivered from pump 114 to hydraulic motor 116 produces rotation of shaft 117 and the associated gears 118 and 119. Gear 118 meshes with an idler gear 125 that meshes with a gear 120L carried by sleeve 121L; a sun gear 122L is affixed to sleeve 121L. Gear 119 is connected directly to a gear 120R that is carried by sleeve 121R; sleeve 121R carries a sun gear 122R.

During straight ahead motion hydraulic pump 114 is set at its zero displacement position so that sleeves 121R and 121L receive no power from the steering drive train (element 117 and associated gearing); therefore sun gears 122R and 122L are inactive idler elements. However pump 114 may be energized to produce rotational control forces in sun gears 122R sand 122L. When pump 114 operates to rotate gear 122R opposite to ring gear 84R the resultant speed of carrier 85R (and sprocket 26R) is related to the differential of the speeds of gears 122R and 84R. When sun gear 122R is rotated in the same direction as ring gear 84R the resultant speed of carrier 85R is related to the summation of the speeds of gears 84R and 122R (and the load on sprocket 26R).

Gear 118 is connected to a gear 120L through an intermediate idler gear 125; therefore, for a given direction of shaft 117 gears 120L and 120R will be powered in opposite directions (one clockwise, the other counterclockwise). The opposite directions taken by gears 120L and 120R produces different rotational speeds of the left and right hand sprockets. At low pump 114 displacements one sprocket will merely be slowed down relative to the other sprocket; at higher pump displacements one sprocket may reverse direction to accomplish a more rapid turn action. The pump is stroked in one direction to produce a right turn and in the opposite direction to produce a left turn. At zero pump displacement motor 116 is deenergized so that gears 122L and 122R act as idlers; both sprockets 26L and 26R are driven by shaft 83 in the same direction and at the same speed to effect straightline movement of the vehicle.

NORMAL BRAKING SYSTEM

Normal manual braking is accomplished by engaging clutches (braking elements) 86L and 86R. Thus, with each clutch engaged the respective carriers 85L and 85R are held motionless (along with the sprockets 26L and 26R). Rotational force inputs from shaft 83 to ring gears 84L and 84R are relieved by continued rotational movements of the planet gears around the individual planet axes.

Clutches 86L and 86R may be moved to their engaged conditions by driver-actuation of a pedal 126 or other control device associated with master cylinder 127. When control device 126 is actuated by the driver, master cylinder 127 delivers pressure fluid through main line 128 and branch lines 129L and 129R, to thereby engage the respective clutches for producing the desired brake action. Solenoid valve 130 is a normally open valve that has no operational effect during normal operating periods.

OBJECTIVES OF EMERGENCY SYSTEM

Should one of the vehicle tracks 24L and 24R break or separate while the vehicle is travelling at high speed (as might be the more usual situation) there is a danger that the vehicle will swerve and possibly roll over. To minimize the danger the present invention proposes an emergency control system that performs the following functions:

1. disengages the manual steering control (i.e., pump 114 and motor 116). 2. disengages manual brake application to drive sprockets 26L and 26R (i.e., clutches 86L and 96R).

3. inhibits manual change in the speed drive ratio (i.e., retains energization of the selected valve 80V or 94V or 105V or 106V even though the driver might operate selector switch 132 in an adverse fashion).

4. maintains engine speed at minimum level for supplying hydraulic pressure to the emergency system.

5. applies non-skid brake action to selected ones of road wheels 14 and/or shoe 160 (FIG. 3). It is believed that by performing these five functions automatically in response to the loss of one track 24L and 24R it should be possible to smoothly bring the vehicle to a safe stop without dangerous swerving or roll-over.

Emergency disengagement of the manual steer control 114 is considered desirable in order to promote straightline travel of the vehicle during the emergency braking period. When one track separates the rolling resistance on that side of the vehicle initially lessens, thus tending to make that side move faster than the other side in a swerving fashion. The normal steer mechanism (members 114, 116, etc.) operate on the supposition that both drive sprockets 26R and 26L will be loaded. However, when one of the tracks breaks the associated sprocket (26R and 26L) is rapidly unloaded so that steering forces are then applied only to the still-tracked side of the vehicle. Any manual application of steering force will in such a situation usually aggravate or promote an undesirable swerving action.

Emergency disengagement of the manual brake is believed desirable because at the onset of the emergency the manual brake is no longer effective on the untracked side of the vehicle. Thus, assuming the right track breaks, under such conditions the applications of manual braking action by clutch 86R has no effect on vehicle movement because the right sprocket 26R no longer has an operative "track" connection to the ground surface. Manual brake force effectively applied only to the left (still-tracked) side of the vehicle would aggravate a swerve action because the tracked side would usually be the slower side not then requiring or desiring brake action.

Emergency inhibition of speed drive ratio change (lock out of selector mechanism 132) is considered advantageous because power is then delivered to the still-tracked side of the vehicle at the rate prevailing just before track-loss occurrence (emergency condition). Power delivery to the still-tracked side accelerates that side relative to the untracked side, thereby wholly or partially counteracting the skidding tendency caused by the lessened rolling resistance of the untracked side. Also, when the transmission is effectively locked in its pre-emergency speed ratio position there is a lessened possibility that the driver will inadvertantly or intentionally put the transmission into a neutral condition. Without power at drive shaft 83 both sprockets 26L and 26R become useless for swerve control purposes.

FIG. 6 EMERGENCY SYSTEM

The primary emergency control devices are the emergency brake elements 36 at the road wheels 14 (or skid elements 160). These brake elements are effective on the tracked wheels 14 and on the non-tracked wheels 14. Preferably the brake forces are continuously switched away from the slower road wheels and onto the faster road wheels in the fashion of conventional non-skid automotive braking systems. In such sysems when the brake action causes the faster moving wheels to decelerate below the other wheels the brake force is then switched to those outer wheels.

The emergency control system is triggered into operation by one or more track loss sensors (similar to sensors 58 and/or 58a and/or 58b) which deliver a track loss signal to a signal processor 55; the processor functions merely to amplify and/or translate the signal into a useful analog signal in output line 57. The analog signal is delivered through main signal line 59 and various branch lines 59a, 59b and 59c leading respectively to solenoid valve 130, solenoid valve 140, and the coil portion of relay 142.

Valve 130 may be a three way valve arranged to dump the hydraulic output of master cylinder 127 when the valve solenoid is energized. Thus, on the occurrence of a track loss signal the conventional brake clutches 86L and 86R are prevented from being engaged even though the driver applies panic pressure on pedal 126.

Valve 140 may be a three way valve for dumping the output of pump 114 to the sump when the valve solenoid is energized. As shown in the drawing the valve is located in a high pressure passageway 141 between pump 114 and motor 116. During normal run periods passageway 141 delivers the pump output to motor 116. During emergency conditions the valve vents the pump output to the sump, thereby stopping the delivery of steering torque to shaft 117 and the associated gears 120L and 120R (FIG. 5). Therefore, even though the driver may apply a panic force to the controller for pump 114 such action will have no steering effect. Valve 140 thus constitutes a steer lock-out mechanism.

Relay 142 comprises a coil and two sets of contacts 137 and 143. Energization of the coil by the track loss signal closes contacts 143 and opens contacts 137. Assuming switch 132 is then at the position where relay 134a is in an energized condition, current will flow across contacts 144 to provide continued energization for the coil of relay 134. This action maintains relay 134a in a circuit-closed condition even though the driver might inadvertantly or deliberately move the selector switch 132 to a different contact setting. Thus, the transmission gearing remains in whatever speed ratio setting it happens to be in prior to the emergency track-loss situation. Any panic reactions on the part of the driver therefore have no effect on the emergency brake operation. An electrical system would comprise one "master" relay 142 for the selector switch 132, and one hold-on relay 134a, 134b, etc. for each solenoid valve 80V, 94V, 105V or 106V. Only two of the four hold-on relays are shown in the drawing.

As seen in FIG. 6, the emergency brake elements 36L and 36R are arranged to grip discs 34L and 34R carried by the hub portions of selected road wheels 14L and 14R. Structural details are better shown in FIG. 2. The source of emergency brake fluid may be a pre-pressurized fluid cylinder 147 arranged to deliver pressure fluid to the supply conduits 148L and 148R for the respective emergency brake cylinders 36L and 36R. During normal run conditions (i.e., with both sides operatively tracked) the solenoid valves 149L and 149R place the brake cylinders in communication with the drain, thereby precluding emergency brake engagement. During emergency conditions the solenoids for valves 149L and 149R are selectively energized to place the brake cylinders 36L and 36R in communication with the pressure source 147.

The valve solenoids may be pulsed on and off in response to analog signals generated by the road wheel sensors 46L and 46R; the technology is similar to that employed in conventional automotive non-skid brake systems. As shown schematically in the drawing the analog signals from sensors 46L and 46R are applied to a comparator 150 which has two output terminals connected to the solenoid energizer lines 151L and 151R. The comparator is triggered to an activated condition by a reference potential source 152 that is initially energized or triggered by a signal from processor 55. The processor is in turn controlled or triggered by the track loss sensors 58; therefore, the track-loss sensors are indirectly responsible for activating the comparator 150.

When comparator 150 is activated the output lines 151L and 151R are selectively energized according to the relative signals produced by wheel speed sensors 46L and 46R. For example, if the left road wheels 14 are rotating faster than the right road wheels comparator 150 output will be through line 151L to energize valve 149L, thereby producing braking action on the left road wheels. When or if the braking action causes the left road wheels to rotate at a lesser speed than the right road wheels the comparator 150 output will shift to line 151R, thereby energizing valve 149R for braking the right road wheels.

It would be possible to utilize road wheel braking elements 36 for both normal and emergency braking operations; this would permit elimination of the sprocket brakes 86. However, under normal run conditions the application of brake forces to the road wheels might produce adverse effects such as skidding of the road wheels or high road wheel wear. Therefore it is preferred to use separate brakes at the sprockets for normal brake function.

As previously noted, the emergency brake action may be obtained by the use of one or more skid rams 160, 164 (FIG. 3). When two such skid rams are employed near opposite sides of the vehicle the brake devices may be controlled by a control system similar to that shown in FIG. 6, in which case each fluid cylinder 164 would be operatively located in the functional positon occupied by the brake caliper 36L or 36R. When a single skid ram is employed on the vehicle centerline the comparator 150 and wheel speed sensors 46L and 46R are omitted from the control system. In that event the analog signal from processor 55 is applied directly to the control valve 149 for the skid ram cylnder 164.

EMERGENCY ENGINE SPEED CONTROL

It may prove necessary or desirable to provide automatic mechanism responsive to the onset of emergency conditions for maintaining engine r.p.m. at a minimum valve necessary for supplying hydraulic pressure to the emergency components such as pumps 74 and 131. There is illustrated in FIG. 6 an emergency engine energization system that operates to ensure continued delivery of fuel to the engine in spite of adverse panic action on the part of the driver.

The illustrated engine 170 is arranged to drive shaft 68 (FIG. 5) for propelling the vehicle. During normal run operations liquid fuel from source 171 is pumped by pump 172 through a solenoid valve 173 to fuel injectors 174 whose stroke (output) is mechanically controlled by the usual accelerator pedal 175; the mechanical connection between the pedal and the injectors is shown as a dash line 176. A functionally similar system can be devised for carburetted engine.

It is intended that in the illustrated system fuel injectors 174 will be effectively de-activated during the emergency (track loss) period; during this period cetain auxiliary fuel injectors 185 will be activated and operated or controlled by an auxiliary motor 184. Simultaneous deactivation of injectors 174 and activation of injectors 185 can be effectively accomplished by means of solenoid valve 173. When electrically energized the valve shifts pump 172 output from injectors 174 to injectors 185. Motor 184 controls the injector stroke through the mechanical connection shown by dash line 187.

Maximum operational safety is believed attainable under conditions wherein the engine speed at the onset of the emergency (track loss) is maintained throughout the duration of the emergency. The electrical circuitry therefore preferably includes means for comparing two electrical signals, one related to engine speed at the onset of the emergency and the other related to different instantaneous engine speeds that might occur throughout the emergency period.

The "onset engine speed" signal may be derived from a potentiometer 178 that is mechanically linked to the control arm for fuel injectors 174. The necessary mechanical linkage is denoted by reference numeral 188. Electrical output of potentiometer 178 is applied through line 182 to comparator 180. A "hold" unit in the comparator translates that signal into a reference voltage which can be continuously or repetitively compared to a voltage signal produced in line 179 by an engine-driven tachometer 181.

During the duration of the emergency period the output of comparator 180 is applied through line 183 to injector control motor 184 and a latchable relay 189. In its latched state the relay energizes solenoid valve 173 so that fuel pump 172 outut is directed to injectors 185. Should the engine speed vary from its "onset" value the tachometer 181 will deliver a signal through line 179 which is different than the reference signal at line 182. Comparator 180 output will thus be logic 1 or logic 0, to appropriately energize motor 184 for adjusting the injectors 185 in the direction necessary to restore the engine to the speed possessed at the onset of the emergency. Maintaining a relatively constant engine speed ensures continued operation of the pumps and other components during the emergency period.

SUMMARY OF OPERATIONS

During normal run periods (both tracks operative) the track loss sensors 58 are in a no-signal status. Accordingly the signal processor 55 holds out the "activate comparator circuitry" 152. Also, the solenoid valves 130 and 140, as well as the master relay 142, are de-energized. Accordingly the propulsion engine 170 is controlled by manual pedal 175 in the usual fashion. The power transmission is selectively engaged by suitable actuation of selector switch 132. Normal steering control is achieved by varying the displacement of pump 114 (valve 140 is in a no-obstruct condition in line 141). Normal braking is achieved by pressure on pedal 126 (valve 130 is in a no-obstruct condition in line 128). The emergency brakes 36L and 36R (or skid ram 164) receive no actuating fluid because valves 149L and 149R obstruct flow through lines 148L and 148R.

In the event that one track 24L or 24R breaks the track loss sensors 58 on the lost-track side of the vehicle produce a signal that is delivered through line 59 to valves 130 and 140, and relay 142. Electrically energized valve 130 prevents the river from actuating brakes 86L and 86R. Electrically energized valve 140 locks out the manual steering control by depriving motor 116 of actuating fluid. Electrically energized relay 142 closes contacts 143 which are connected to the various contacts 144 of the four relays 134a, 134b, etc; the coil of the energized relay 134a, 134b, etc. will thereby remain energized. The non-opened contacts 137 in relay 142 will interrupt current flow through selector switch 132; therefore panic actuation of switch 132 will have no effect on the transmission function. The track loss signal generated by processor 55 will activate comparator 150 so that signals from wheel speed sensors 46L and 46R are effective to pulse the emergency brake solenoid valves 149L and 149R (or the equivalent valve used with skid ram 164). At the same time comparator 180 will be activated to operate motor 184 and valve 173 for the purpose of maintaining engine 170 speed even though the driver releases the pressure on pedal 175.

At the onset of the track loss emergency the described system operates to prevent brake application to the still-tracked sprocket 26L or 26R, locks out manual steering inputs to the sprockets, maintain engine r.p.m. and clutch engagement, and apply emergency brake force to the road wheels or skid ram.

I wish it to be understood that I do not desire to be limited to the exact details of construction shown and described for obvious modifications will occur to a person skilled in the art.

I claim:

1. In a track-propelled vehicle having an endless terrain-engagement track at each of its sides trained around a drive wheel and a series of road wheels, and a power plant operatively connected to the drive wheels for delivering mechanical power thereto: the improvement comprising emergency brake means operable upon loss of either track to automatically decelerate the vehicle toward a rest condition without human intervention or input; and track loss sensor means effective to trigger the emergency brake means, whereby said emergency brake means has no effect during normal operation of the vehicle.

2. The vehicle of claim 1: said emergency brake means comprising a hydraulic pressure source, hydraulically-actuated brake elements at selected ones of the road wheels, valve means effective during normal operation of the vehicle to isolate said brake elements from said pressure source, and means controlled by the track loss sensor means for operating the valve means so that the pressure source communicates with the brake elements upon loss of a track.

3. The vehicle of claim 2: and road wheel speed responsive means effective during lost-track situations to modulate hydraulic pressure applied to the emergency brake elements inversely accordingly to relative road wheel speeds on opposite sides of the vehicle, thereby minimizing skidding tendencies during the emergency braking period.

4. The vehicle of claim 1, and further comprising manually-controlled fluid brake means for decelerating the vehicle during normal operations; said manually-controlled brake means including brake elements at the drive wheels, and a master cylinder operable to deliver pressurized brake fluid thereto under manual control: the aforementioned emergency brake means comprising a pressurized brake fluid source separated from the master cylinder, auxiliary brake elements at selected ones of the road wheels on each side of the vehicle, and control means triggered by the track loss sensor means for simultaneously disconnecting the drive wheel brake elements from the master cylinder and connecting the auxiliary brake elements to the emergency brake fluid source.

5. The vehicle of claim 1: the emergency brake means comprising a skid ram that includes a terrain-engageable shoe and a fluid cylinder for moving the shoe downwardly onto the terrain only when the track loss sensor means registers a lost track condition.

6. The vehicle of claim 1 wherein the vehicle is steered by steer means that comprise a hydraulic pump-motor mechanism; the further improvement comprising control means activated by the track loss sensor means for disengaging the steer means by dumping hydraulic output from the steering pump.

7. The vehicle of claim 1 wherein the power plant is connected to the drive wheels by a hydro mechanical transmission that includes a system of manually controllable valves: the further improvement comprising control means activated by the track loss sensor means for isolating the valves from manual control forces during lost-track situations.

8. The vehicle of claim 1 wherein the power plant comprises an engine: the further improvement comprising control means activated by the track loss sensor means for maintaining engine speed above a predetermined minimum valve during lost-track situations.

9. The vehicle of claim 8: said speed control means including reference engine speed signal means, actual engine speed signal means, and a comparator receiving the outputs of the two signal means.

* * * * *